(12) United States Patent
Sill et al.

(10) Patent No.: US 10,696,495 B2
(45) Date of Patent: Jun. 30, 2020

(54) FLEXIBLE CHAIN DIVERTER REDIRECTION ASSEMBLY

(71) Applicant: Automated Industrial Technologies, Inc., Forest, VA (US)

(72) Inventors: Gary Sill, Forest, VA (US); Paul Wright, Palm Harbor, FL (US)

(73) Assignee: Automated Industrial Technologies, Inc., Forest, VA (US)

( * ) Notice: Subject to any disclaimer, the term of this patent is extended or adjusted under 35 U.S.C. 154(b) by 0 days.

(21) Appl. No.: 16/578,976

(22) Filed: Sep. 23, 2019

(65) Prior Publication Data
US 2020/0095071 A1 Mar. 26, 2020

Related U.S. Application Data

(60) Provisional application No. 62/735,404, filed on Sep. 24, 2018.

(51) Int. Cl.
*B65G 47/90* (2006.01)
*B65G 17/40* (2006.01)
*B65G 17/06* (2006.01)

(52) U.S. Cl.
CPC ......... *B65G 47/907* (2013.01); *B65G 17/067* (2013.01); *B65G 17/40* (2013.01); *B65G 2201/0244* (2013.01)

(58) Field of Classification Search
CPC .......... B65G 47/907; B65G 2201/0244; B65G 17/40; B65G 17/38; B65G 17/42; B65G 17/067; B65G 17/068

USPC .......... 198/850–853, 626.1, 626.5
See application file for complete search history.

(56) References Cited

U.S. PATENT DOCUMENTS

| | | | | | |
|---|---|---|---|---|---|
| 2,658,654 | A | * | 11/1953 | Schweizer | B67B 3/2046 53/318 |
| 2,860,520 | A | * | 11/1958 | Sull | B65G 17/38 474/220 |
| 3,084,378 | A | * | 4/1963 | Macy | A22B 5/0052 452/149 |
| 5,401,207 | A | * | 3/1995 | Hicks | A22C 29/021 452/1 |
| 5,842,818 | A | * | 12/1998 | Simkowski | B65G 47/715 406/88 |
| 6,390,276 | B1 | * | 5/2002 | Haug | B65B 5/06 198/377.01 |
| 6,854,586 | B1 | * | 2/2005 | VanderMeer | B65G 37/005 198/436 |
| 2013/0240335 | A1 | * | 9/2013 | MacLachlan | B65G 17/08 198/853 |

* cited by examiner

*Primary Examiner* — James R Bidwell
(74) *Attorney, Agent, or Firm* — John H. Thomas, P.C.

(57) ABSTRACT

A flexible chain diverter system acts as a moveable diverter "swing-arm" capable of dispensing groups of bottles into the array of entrance gates for loading onto a shipping pallet. The flexible chain has a variable axial length. As a result of the ability to change in axial length, the diverter described herein can remain taut at the shortest distance gates and can stretch to reach gates at the maximum range of reach. This allows for the path length of travel to be optimized for any gate.

14 Claims, 15 Drawing Sheets

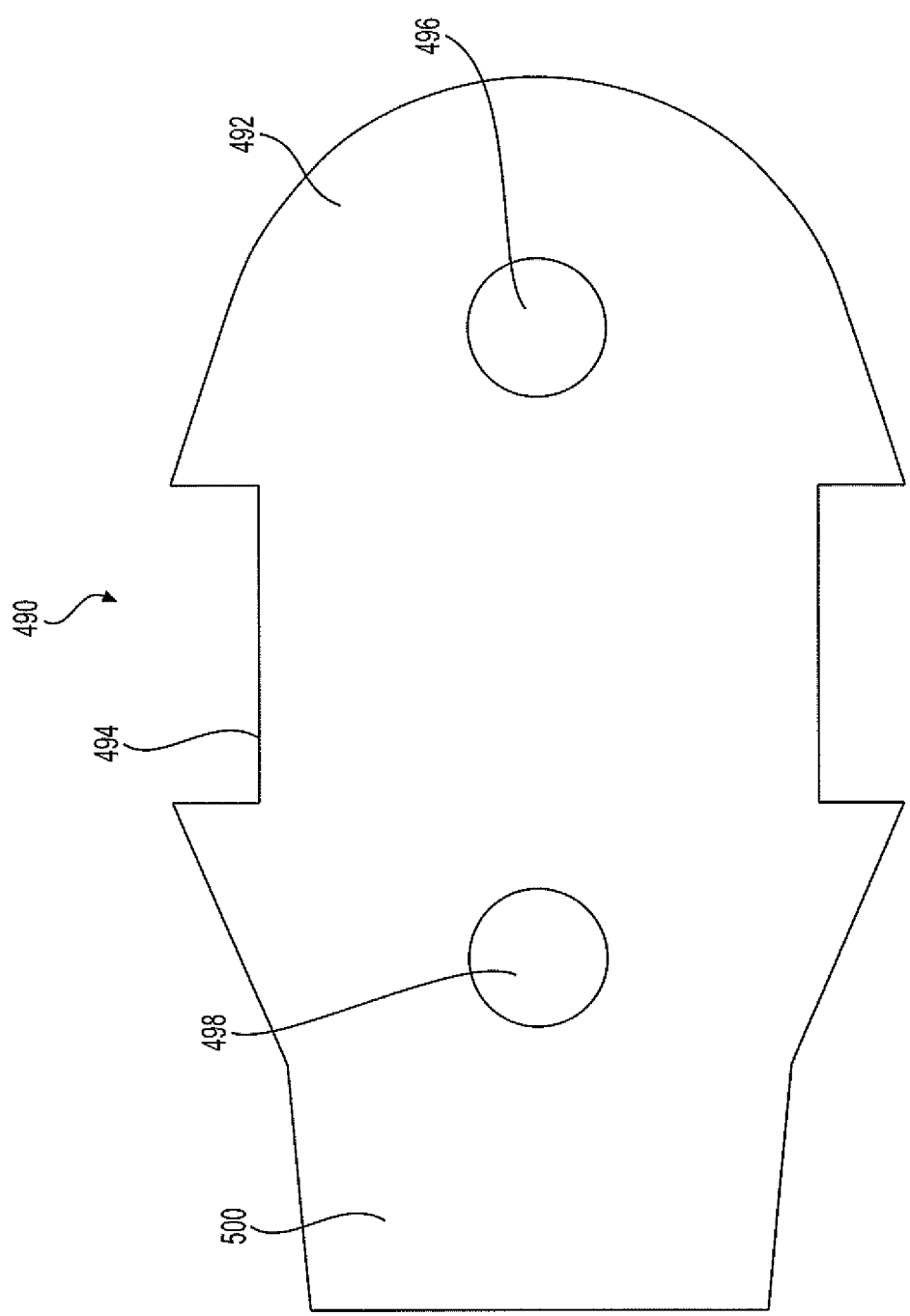

FLEXIBLE CHAIN DIVERTER REDIRECTION ASSEMBLY

This application claims the benefit of filing of U.S. Provisional Patent Application No. 62/735,404 filed on Sep. 24, 2018, which is incorporated by reference herein in its entirety.

The present invention is a flexible chain guide conduit assembly through which items may be transported on a conveyor transporting the items under the conduit assembly. In one example, the items passing through the conduit assembly are bottles.

BACKGROUND

Conveyor systems in many shapes and forms are used widely in manufacturing and industrial processes. Specifically, there are many dispenser systems that employ even more different dispenser systems at the packaging end of the manufacturing process. These systems make use of a conduit or conveyor track to funnel components from one position on a conveyor across an expanse to another position. The conduit or conveyor track is designed like a pivot arm so that the track can be swung about the pivot point to align the exit port of the conduit or conveyor track to align with a receiving entry port/gate of the next stage of the process, for instance packaging. An alignment guide system ensures the product passes through the conduit without jamming or losing speed. These guide systems are comprised of units or "links" that are attached together to form a chain conveying guide diverter. This chain can be manipulated to direct bottles into the proper recipient gates. Existing systems typically use a fixed-length pivot-arm to dispense product. This forces the receiving gates of a packaging setup, in one example, to be set in an arc-shaped block with a center-point at the pivot point of the pivot arm.

When using a fixed-length chain guide in another example, the pivot arm must feed into a second small segment. The small segment connects the end exit of the pivot arm with the receiving entry gate of the next stage of the conveyor. The small segment floats between the exit end of the pivot arm and the receiving entry gate allowing the receiving entry gates to remain in a linear arrangement, instead of following an arc profile. The pivot arm is then able to swing about the pivot point with the exit end successfully dispensing product into each next-stage receiving gate.

There also exist diverters composed of flexible sides which allow the diverter to flex and bend in different positions. The flexible nature of these diverters allows the entrance gates to fall along a linear profile perpendicular to the direction of flow. This design of flexible arm does not change in axial length, however, and in order to reach gates at the extremes of travel, there must be sufficient slack in the diverter arm length in order to accommodate the longer distance of reach. This results in a curved diverter profile when the diverter is relaxed and in position to reach gates of the shortest distance from the pivot point. This curved profile can pose an issue with processing time as the bottles must travel a greater path distance than necessary to reach nearest gates, this results in time wasted. A curved profile may also potentially slow down and allow product to back up in a flexible diverter as a result of the increased angle between the flexible path and the straight line between the entrance and exit positions.

SUMMARY

Accordingly, it is an object of the present invention to overcome the shortcomings of existing, rigid diverter systems. By using spring links, the length of the chain may be extended and retracted to meet the requirements of the length needed to match up the feeding conduit with exit gates to transfer items along the conveyor and to specific destinations.

In one example, a flexible chain diverter for use in a conveyor system comprises a plurality of chain links, each chain link comprising a plurality of vertical sidewall channels having upper and lower portions and a bottom of the lower portion adapted to rest on a conveyor surface under the chain links. At least one of the plurality of chain links comprises a flexible spring link fixed on their sides to the upper portion of a pair of the vertical sidewall channels, with each at least one spring link having two pin holes with one pin hole through a back portion and one pin hole through a front portion of the spring link. The back portion pin hole is generally round and corresponds generally in size to a first round link pin adapted to be mounted therethrough, wherein the front portion of the spring link is annular and has an extension into the annular space, and further wherein the extension defines a valley that is a recess that is open in the direction of the front side of the spring link, and the front portion further defines mandibular tabs and a stop bump. The valley extends from a rear side of the front portion of the spring link and the mandibular tabs are a pair of tabs that extend almost but not entirely across the open section of the valley and form a gap between them, and the stop bump extends backwardly from the back side of the front portion of the spring link, the stop bump being aligned with the open section of the valley and a gap between the mandibular tabs, wherein a second round link pin is adapted to be mounted through the valley and is longitudinally movable for a predetermined distance across the valley to engage the mandibular tabs and to be stopped by the stop bump. The flexible chain diverter may further comprise guide blocks fixed to the inside of the vertical sidewall channels and/or a support block attached to each bottom of the vertical sidewall channels, wherein the support blocks are adapted to rest on the conveyor surface. The spring link may comprise a tail section of the back portion, and the tail is adapted to be retained within the upper portions of the vertical sidewall channels of an adjacent chain link. The tail may define a tail angle that is converging so that the tail is narrowing at the end of the back portion of the spring link. The tail angle may be between about one and 15 degrees, or alternatively between about 2 and 10 degrees. The spring link mat be formed of a flexible polymer foam or rubber. The valley may define a semi-circular U-shape. The plurality of chain links may comprise a non-spring link.

In another example, a flexible chain diverter for use in a conveyor system comprises a plurality of chain links, each chain link comprising a plurality of vertical sidewall channels having upper and lower portions and a bottom of the lower portion adapted to rest on a conveyor surface under the chain links. Each chain link further comprises a flexible spring link fixed on their sides to the upper portion of a pair of the vertical sidewall channels. Each spring link has two pin holes with one pin hole through a back portion and one pin hole through a front portion of the spring link, wherein the back portion pin hole is generally round and corresponds generally in size to a first round link pin adapted to be mounted therethrough. The front portion of the spring link is annular and has an extension into the annular space, and further wherein the extension defines a valley that is a recess that is open in the direction of the front side of the spring link, and the front portion further defines mandibular tabs and a stop bump. The valley extends from a rear side of the front portion of the spring link and the mandibular tabs are a pair of tabs that extend almost but not entirely across the open section of the valley and form a gap between them, and the stop bump extends backwardly from the back side of the front portion of the spring link, the stop bump being aligned with the open section of the valley and a gap between the mandibular tabs, wherein a second round link pin is adapted to be mounted through the valley and is longitudinally movable for a predetermined distance across the valley to engage the mandibular tabs and to be stopped by the stop bump. Each spring link may comprise a tail section of the back portion, and the tail is adapted to be retained within the upper portions of the vertical sidewall channels of an adjacent chain link.

In a still further example, a flexible chain diverter for use in a conveyor system comprises a plurality of chain links, each chain link comprising a plurality of vertical sidewall channels having upper and lower portions and a bottom of the lower portion adapted to rest on a moving conveyor surface under the chain links. At least one of the plurality of chain links further comprises a flexible spring link fixed on their sides to the upper portion of a pair of the vertical sidewall channels, and each at least one spring link having two pin holes with one pin hole through a back portion and one pin hole through a front portion of the spring link. The back portion pin hole is generally round and corresponds generally in size to a first round link pin adapted to be mounted therethrough, wherein the front portion of the spring link is annular and has an extension into the annular space, and further wherein the extension defines a valley that is a recess that is open in the direction of the front side of the spring link, and the front portion further defines a stop bump. The valley extends from a rear side of the front portion of the spring link and defines a semi-circular U-shape, and the U arms of the U-shape extend almost but not entirely across the open section of the U-shape valley and form a gap between them, and the stop bump extends backwardly from the back side of the front portion of the spring link, the stop bump being aligned with the open section of the U-shape valley, wherein a second round link pin is adapted to be mounted through the U-shape valley and is longitudinally movable for a predetermined distance across the valley to engage the U arms and to be stopped by the stop bump.

BRIEF DESCRIPTION OF THE DRAWINGS

FIG. 18 is a top view of a fixed link.

DETAILED DESCRIPTION

The invention is discussed herein in terms of a conveyor system for small bottles. However, a chain in accordance with the invention herein may be engineered similarly for use with the objects that are handled in a conveyor system. One particular process application is responsible for sending small bottles through a conveyor system and onto a shallow pallet/organizer for shipping. It is necessary that the constant stream of bottles produced by the upstream bottling equipment pass through a segment of conveyor where groups of the bottles from the constant stream are diverted into numerous entrance gates at the other end of the conveyor segment (downstream from the segment). These numerous entry gates contain channels or conduits which the bottles pass through. These conduits include, but are not limited to, conduits that are designed so that they take the upright bottles and re-orient them onto their side before allowing them to roll into tracks in the pallet/organizer so that the bottles can be shipped. The bottles sit in the pallet/organizer side by side along the length of the pallet, and end to end along the width of the pallet.

Figure 1:
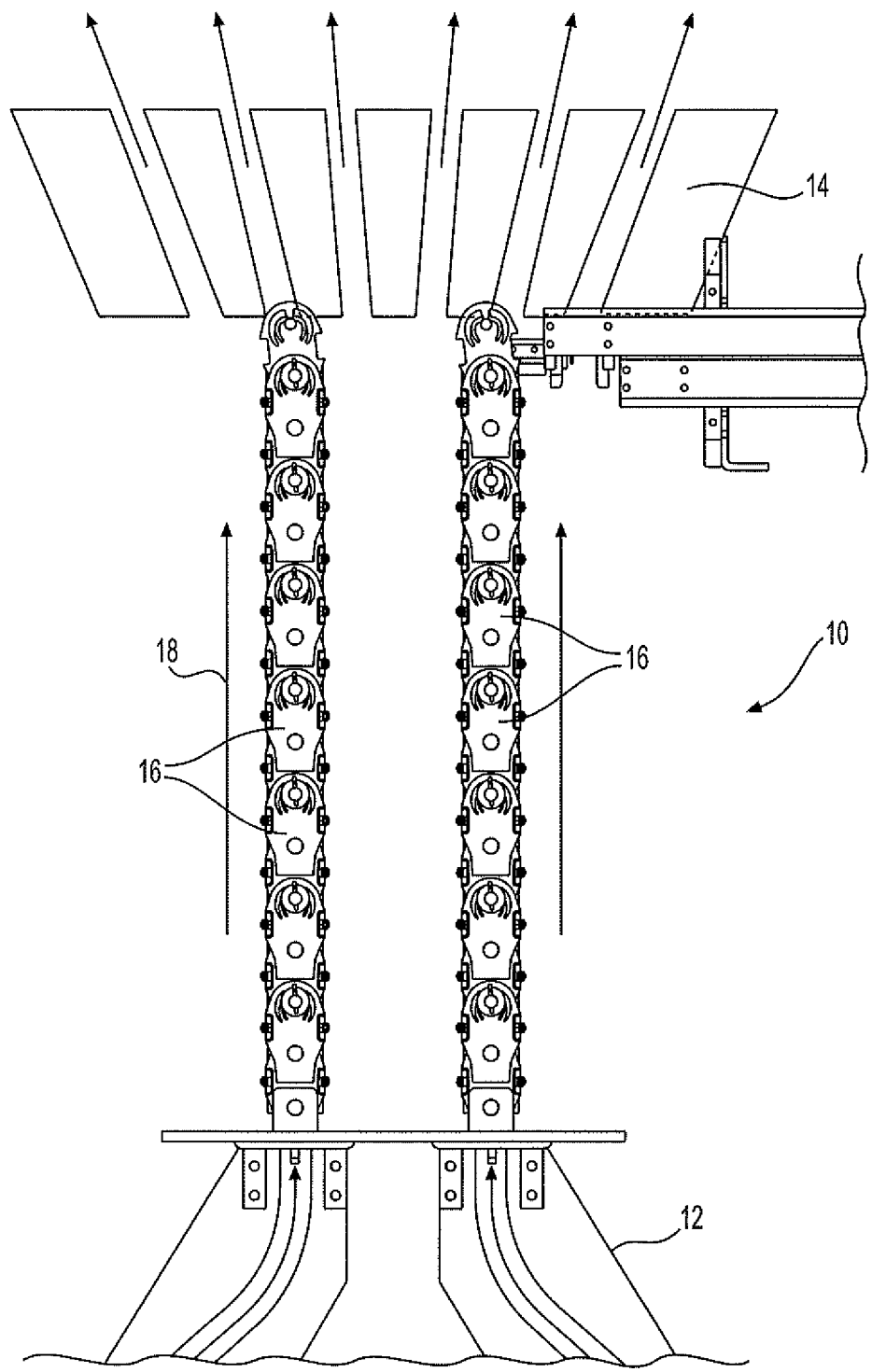
FIG. 1 is a top view of a flexible diverter system as described herein with the flexible diverters show in straight positions.

A conveyor system as described herein includes a flexible chain diverter system. This system was created to enable the smooth and efficient transport of small bottles from the upstream location on the conveyor to the numerous entry gates on a location further downstream on the conveyor. These numerous entry gates receive the bottles and dispense them down guide-tracks into the pallet/crate organizer. The flexible chain diverter system is not powered in any way, and the bottles which pass through it are pushed through the diverter by way of the conveyor on which the flexible chain diverter system rides. The bottles are constrained in the conduit in such a way that the only motion allowed is motion along the path defined by the guides of the flexible chain diverter system. In FIG. 1 there is shown flexible diverter systems 10 (in this example two chains) that are positioned between schematically an upstream piece of equipment 12 that is a source of loose bottles moving in the upward direction 18 as shown in the drawing to an entrance gate in a pallet or organizer system 14. The diverter system 10 is formed of a plurality of flexible chain links 16. In FIG. 1, the flexible diverter system 10 is shown in a straight-line configuration where the chain links 16 are oriented in a substantially straight line between the upstream equipment 12 and the downstream pallet/organizer 14. The actual conveyor surface is a generally flat surface that may include a conveyor belt, rollers rotatably fixed in a plane, or simply a flat surface such as formed of plastic or metal, including but not limited to stainless steel or aluminum. A conveyor surface may change from a moving belt to rollers to flat surface in many combinations. The conveyor surface is not shown in the drawings, because it may vary by application or general system requirements.

Figure 2:
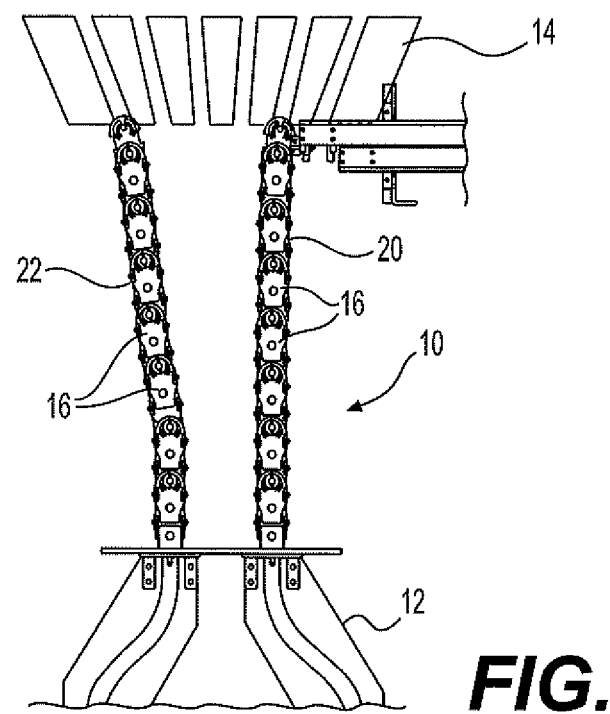
FIG. 2 is a top view of a flexible diverter system as described herein with the left diverter extended to a length more than the straight right flexible diverter.

The flexible chain diverter system acts as a moveable diverter "swing-arm" capable of dispensing groups of bottles into the array of entrance gates for loading onto a shipping pallet. The flexible chain has a variable axial length. As a result of the ability to change in axial length, the diverter described herein can remain taut at the shortest distance gates and can stretch to reach gates at the maximum range of reach. This allows for the path length of travel to be optimized for any gate. In FIG. 2, the same flexible chain diverter system 10 as shown in FIG. 1 illustrates that one of the flexible chains 20 remains in a straight position with respect to the upstream equipment 12 and the downstream pallet/organizer 14. On the other hand, flexible chain 22 is shown on an angle with respect to the upstream equipment 12 and the downstream equipment 14. As noted, this chain 22 is axially longer that chain 20 as a result of the flexible chain links 16 being able to move back and forth in an axial direction.

Figure 6:
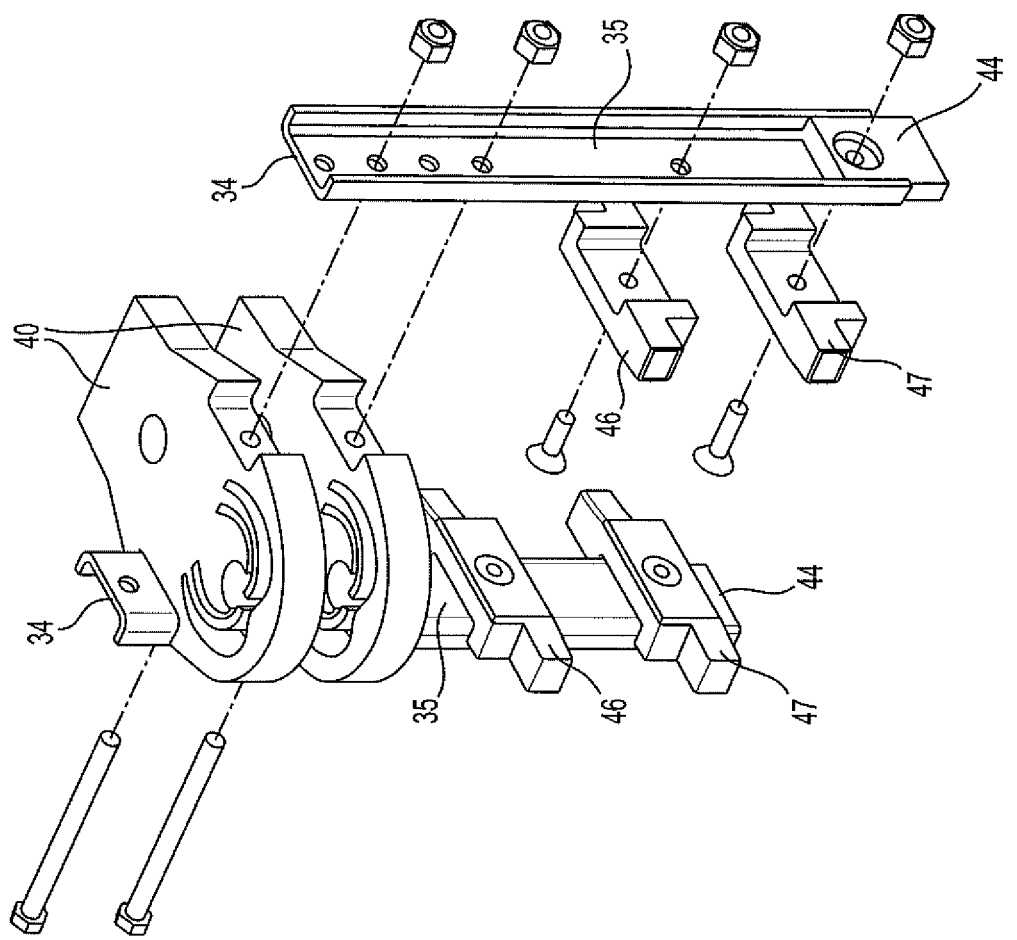
FIG. 6 is a perspective exploded view of a single inner link.

The flexible chain diverter system is composed of any number of two links—an outer link and an inner link. The size of the links is based on the length of the diverter system and the size and shape of the product passing through. These links may be 4-5 inches in length, or alternatively one inch or less to 8 inches in length, and about 2-3 inches wide, or alternatively about ½ of an inch or less to 6 inches wide. These links are fastened together by way of a common pin which is inserted through the tongues (front portion) of the inner link, and the tails (back portion) of the outer link. These two links now form the base unit from which the whole chain is repeated. Each inner and outer link is composed of the following components: (1) a side channel which provides support for the chain (made of stainless steel or another strong and rigid material), (2) a guide block aiding in guiding the flowing products through the chain with least resistance possible (made of a wear-resistant material such as, in one example, ultra-high-molecular-weight polyethylene referred to as UHMW), (3) a wear-resistant support block which provides a footing for the chain (made of a material similar in one example to the properties to UHMW), (4) a spring link which provides the flexure and stretching function of the chain (made of a flexible yet sufficiently rigid material such as UHMW or polymer foam or other appropriate polymer), or a non-spring link and (5) fasteners to attach the components together. The side channels (1) contain 4 holes at the top to allow for the inner chain and outer chain configurations. The spring links are formed of any flexible but durable material to allow both axial extension and retraction. The inner chain configuration has the spring links mounted in the $1^{st}$ and $3^{rd}$ holes from the bottom as shown in FIG. 6. The outer chain has the spring links mounted in the $2^{nd}$ and $4^{th}$ holes from the bottom.

Figure 20:
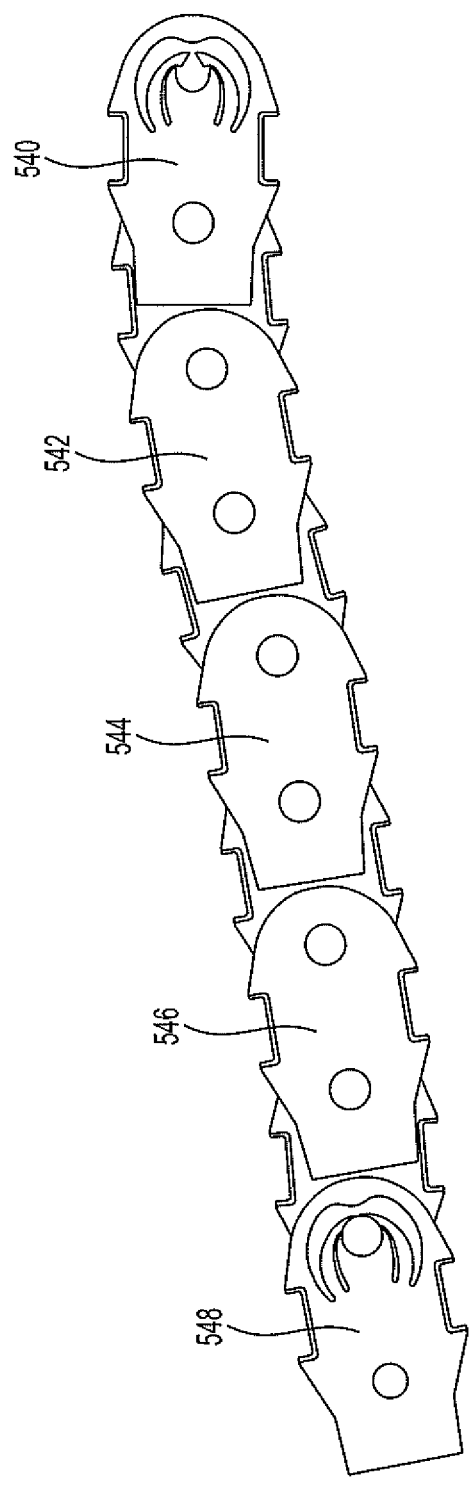
FIG. 20 is a top view of a diverter chain that includes both flexible and fixed chain links.

FIG. 18 illustrates a link that does not feature the spring design. To achieve flexure along the axial direction of the chain, it is to be noted that not all links need to be spring links. Only at least one link in the chain needs to be a spring link to achieve axial flexure. Any combination of spring links and non-spring links in the chain can allow for the flexible chain to function in the required manner. The spring links can be alternated with the non-spring links or can also be used, for instance, at each end of the chain with the non-spring (or fixed) links used in the middle as shown in FIG. 20. In FIG. 20, there is shown spring links 540 and 548 on each side of connected fixed links 542, 544 and 546 in this segment of a five-link chain. Other variations of the locations of respective spring and fixed links are possible.

Figure 3:
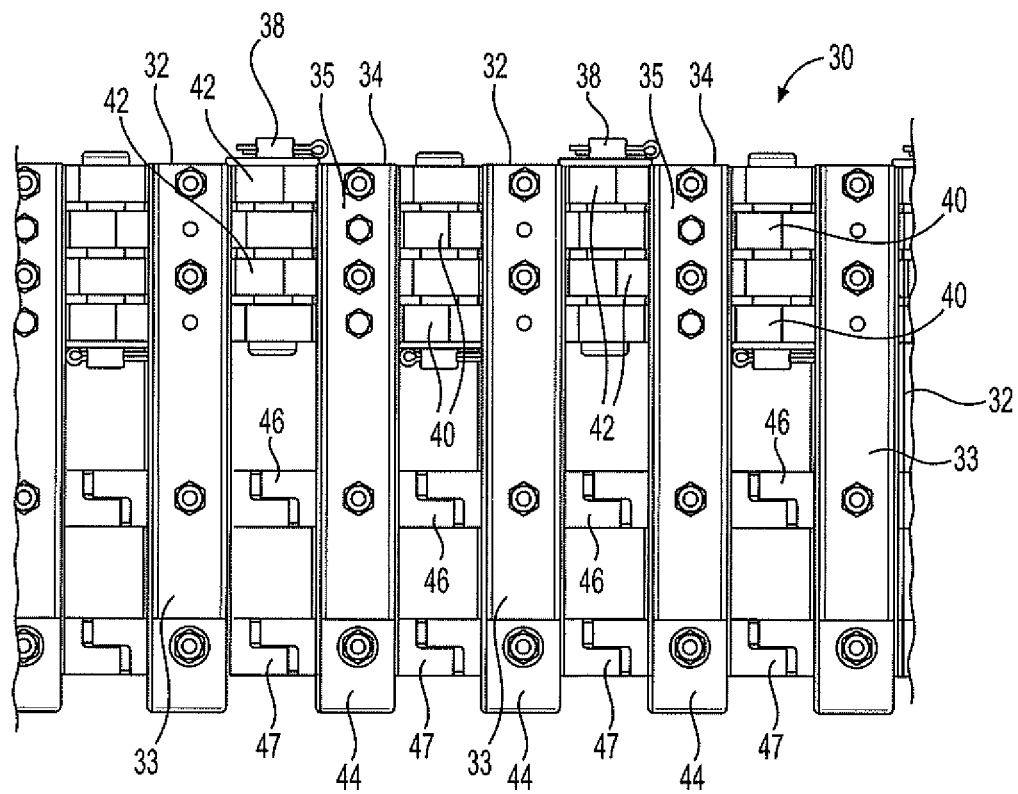
FIG. 3 is a side view of a short segment of a flexible diverter as described herein.
Figure 4:
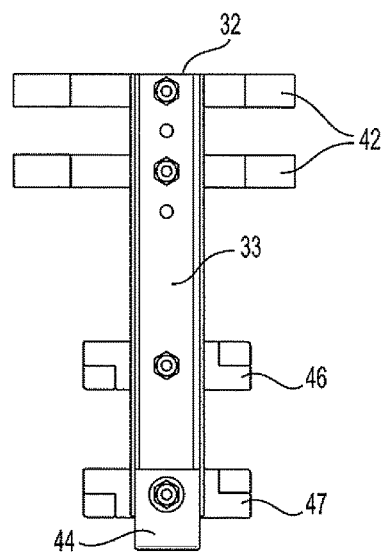
FIG. 4 is a side view of a single outer link.
Figure 5:
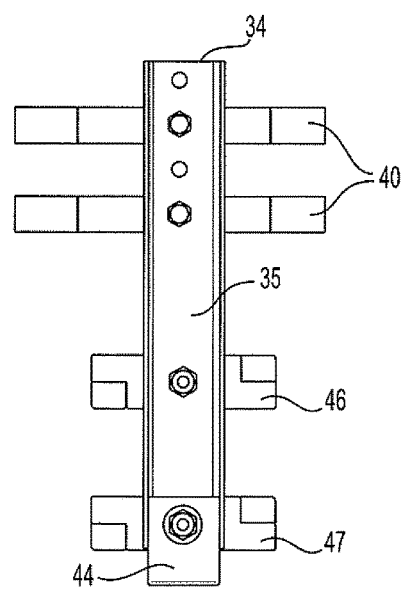
FIG. 5 is a side view of a single inner link.

FIG. 3-6 illustrate the components and assembly of two links 30 in a flexible chain. There are shown inner links 35 and outer links 33. The upper portion 32 of the outer link 33 is shown with a pair of spring links 42 attached thereto. The bottom 44 of each link 33 and 35 is a support block 44. The guide blocks 44 rest on a conveyor or other surface that the flexible chain links 30 are placed onto. Guide blocks 46 are positioned on both the inner link 35 and outer link 33. These guide blocks 46 guide the flow of products, in one example bottles, through the chain. The guide blocks 46 may have overlapping tabs as shown or they may be simply spaced apart. Also, the figures show two levels of guide blocks 46 on the inner link and outer link support channels 33 and 35. There may be only one or more than to such guide blocks 46 in a given installation depending on the size and height of the product moving through the chain diverter system. Also, the inner links 35 and outer links 33 are positioned sequentially and alternating so that the flexible links 40 and 42 overlap when assembled as shown in FIG. 3.

FIG. 3 illustrates a stack of four spring links 40 and 42. It is optionally possible to construct a chain that has a link count of two or more links in height. More links may be appropriate for a stiffer chain and for larger items passing through the chain diverter system. The more links in height, typically, the more secure and stable is the system. It is also optionally possible to construct a chain that has a mixture of spring links and non-spring links (fixed links). This will limit flexure along the axial direction of the chain only to the sections of the chain containing the spring links. Spring links and fixed links can be alternated or linked following a pattern or arrangement as determine by the needs of the application.

The spring link is designed with a spring function. A series of curved cuts create an annular form in the design of the spring system. A "U" shaped annular cutout contains the pin necessary to attach the inner and outer links together, and two mandible-like tabs wrap on either side of the "U" shaped cutout to retain the pin against the inside "valley" of the cutout. When the chain is stretched, the pin is pulled out of the valley of the cutout and is pushed against the mandible tabs. The mandible tabs seek to push the pin back into the valley and this provides a "spring-like" feel and function. Although the pin sits in a valley held by two mandible-like tabs, the pin is fully contained by way of a stop feature which aims inward toward the valley. If the pin is pulled too far out of the valley and is in danger of overcoming the mandible tabs, the stop will keep the pin from being removed from between the mandibles. This ensures a maximum stretch length for the chain and keeps the chain from failing.

The valley is described herein as having a U-shape, but of course other shapes may be used. The valley may be only slightly curved—almost flat. Instead of a curve, the valley may be a square-shaped U. the valley may have more of a V-shape. Effectively, the valley serves as the backstop for the pin in the link.

Figure 7:
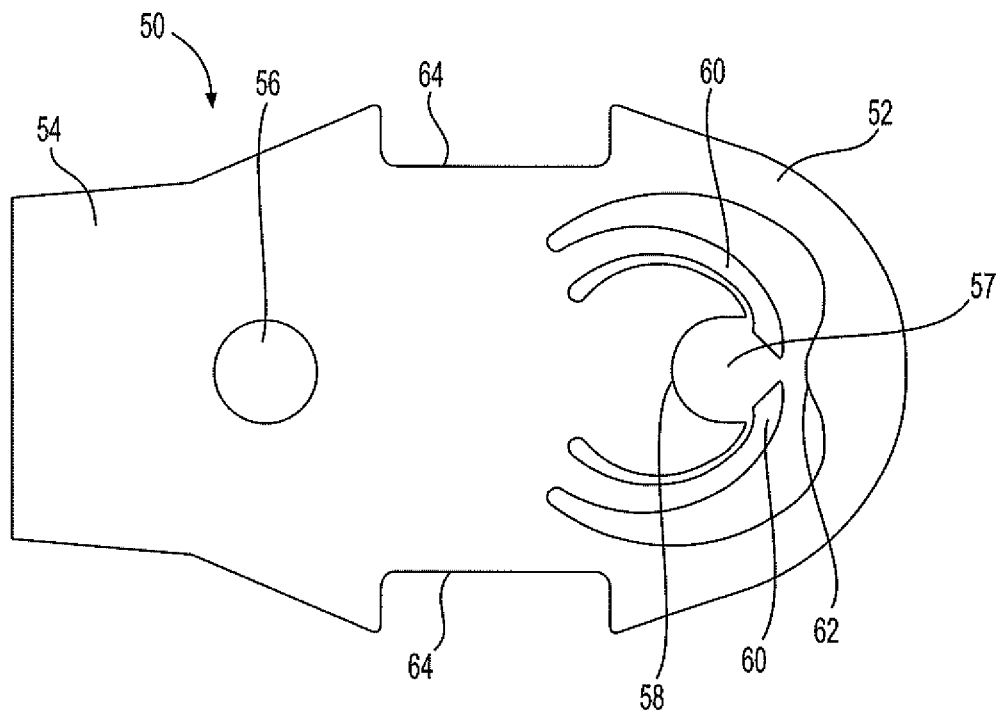
FIG. 7 is a top view of a single spring link.

FIG. 7 illustrates one example of a spring link 50. The spring link 50 has a front portion 52 and a back portion 54. Pin holes 56 and 56 are adapted to receive pins that will extend through the spring link 50. Notches 64 on each side of the flexible link 50 are adapted to receive the vertical channels, not shown. The front portion 52 of the flexible link 50 includes the U-shape cutout 57 for receiving a pin, no shown, defines a valley 58. The mandible tabs 60 extend around the cutout opening 57 until they almost meet. Finally, as explained, a stop 62 is positioned opposite the U-shape cutout 57 to prevent a pin from moving too far out of the valley 58.

Figure 8:
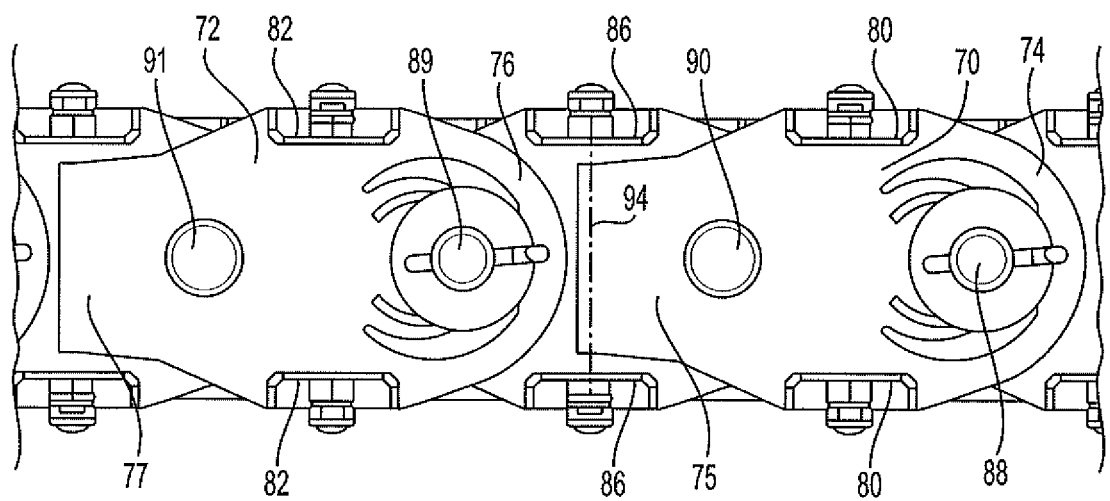
FIG. 8 is a top view of a section of diverter chain.

FIG. 8 illustrates a consecutive pair of flexible spring links 70 and 72. Pins 88 and 89 extend downwardly through the front portions 74 and 76 respectively through U-shape channels, not shown in FIG. 8 but seen in FIG. 7 and other figures. Vertical channels 80 and 82 are connected on the sides of links 70 and 72 respectively. Vertical channels 86 are shown as connected to spring links below and between the side channels 80 and 82. The spring links 70 and 72 also have tails 75 and 77 respectively that form the back portions of those links.

The tail of the spring link is such that it functions as a limit for the range of motion of the spring link when connected to another link. When the side channel is fastened to the spring link, for instance in FIG. 8 and centerline 94, a centerline can be drawn from the midpoint of the width of a side channel on one side through the midpoint of the width of the side channel on the opposite side. The tail 75 of an attached spring link 70 falls in line with this centerline. This shows that the side channels 86 of the spring link coupled with the tail 75 of the spring link 70, act as stops for the range of rotational motion of the spring link, and the rotational range is limited. This range limiting ensures that the product flowing through the flexible chain diverter system will not be hindered in any way by bends in the chain of too tight a radius to pass products.

Figure 10:
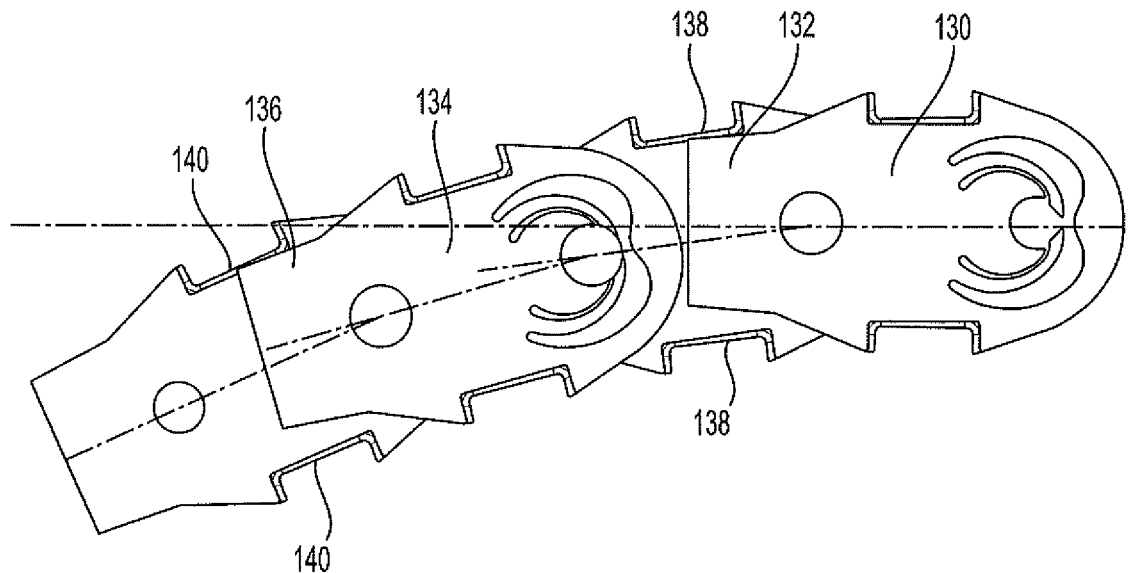
FIG. 10 is a top view of a portion of a diverter chain in a side rotation position.
Figure 11:
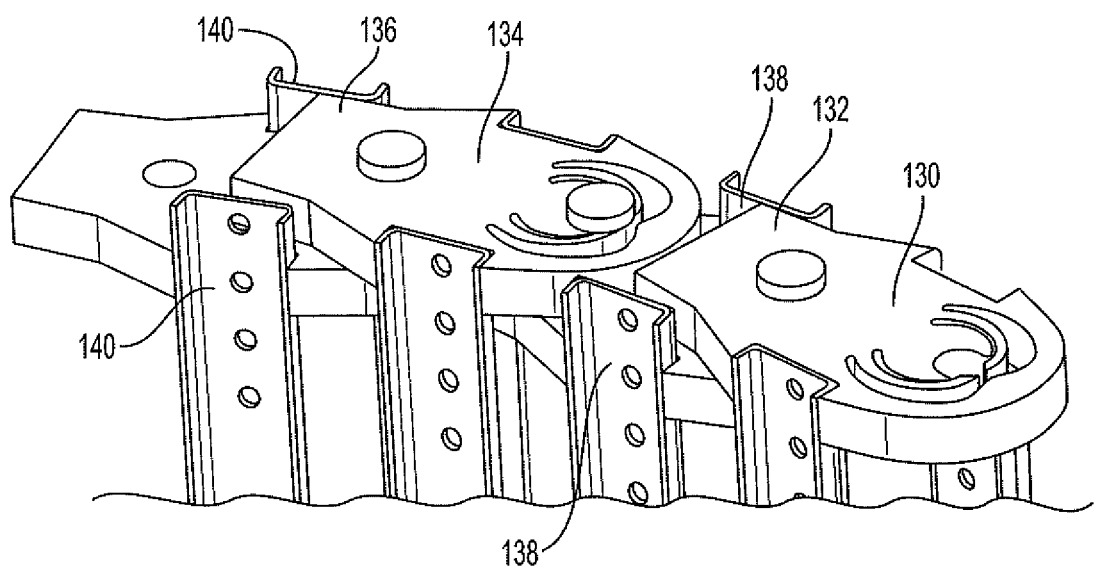
FIG. 11 is a perspective view of a top of a portion of the diverter chain shown in FIG. 10 in a side rotation position.

FIGS. 10 and 11 illustrate a clear example of the limitations imposed on the side movement of the flexible diverter chain by the side channels. Links 130 and 134 include tails 132 and 136 respectively. As shown, vertical sidewall channels 138 and 140 restrain the rotational movement of tails 136 and 132 respectively. Similar links with tails and their blocking by sidewall channels occurs in the links that are seen but not numbered below the links 130 and 134.

Figure 9:
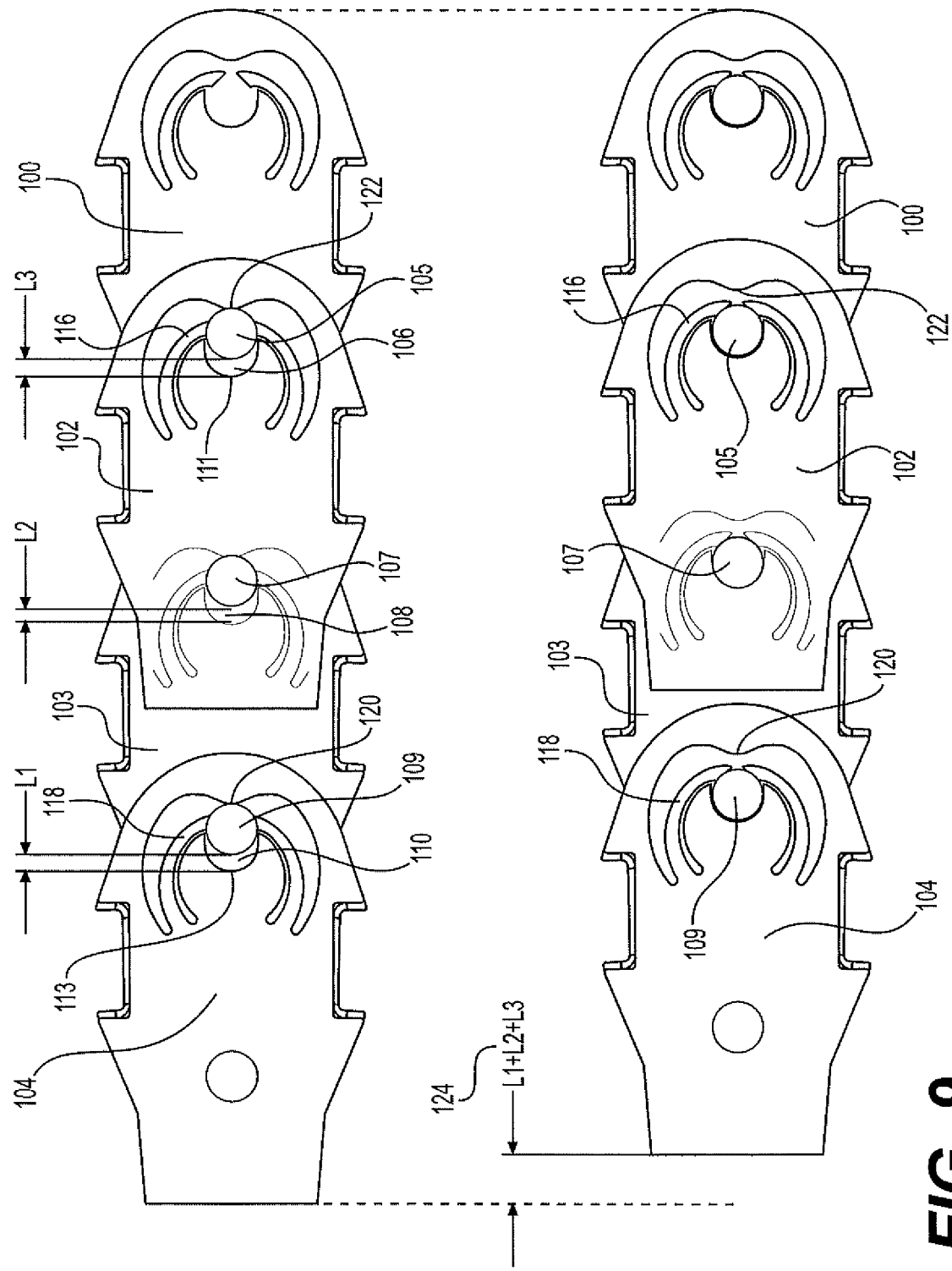
FIG. 9 is a comparative top view of a diverter chain in retracted and stretched states.

FIG. 9 illustrates a simplistic illustration of a relaxed chain (bottom) and stretched or extended chain (top). There is shown four consecutive spring links 100, 102, 103, and 104. Links 102 and 104 are shown on top and illustrate the stretching of the chain. Links 100 and 103 are below and therefore not completely visible in this figure. Pin 107 is fixed in its circular hole. However, pins 105 and 109 can be seen moving in the axial direction between the extended and retracted views. The pins 105 and 109 are engaged by the mandibles 116 and 118 respectively. These mandibles 116 and 118 bias the pins 105 and 109 respectively back toward the valley 111 and 113 respectively. Stops 122 and 120 respectively contain the pins 105 and 109 from their axial movement. Thus, pins 105 and 109 are able to move forward and back the length L3 and L1 respectively. Pin 107 also moves a distance L2 in a comparable valley and mandible and stop system in the link below and not seen in this figure. The cumulative movement of the three pins 105, 107 and 109 allows for an axial movement of up to L1 plus L2 plus L3 124 as shown.

Figure 19:
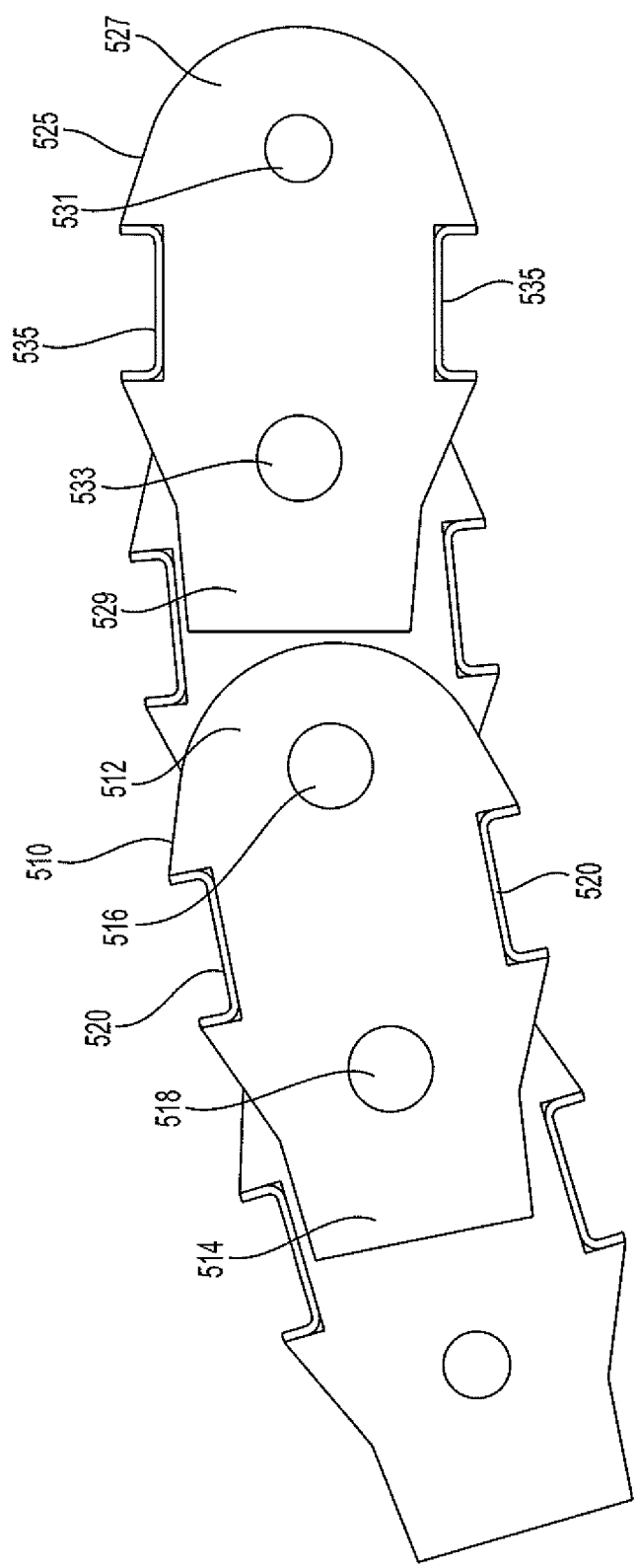
FIG. 19 is a top view of a pair of fixed links shown in a rotational position.

A fixed link functions using the same principles as the spring link excluding the mandible tabs for flexure. Referring to FIG. 18, the fixed link 490 contains two holes 496 and 498 (front hole 496 and back hole 498) for the connecting pins (not shown) but does not allow axial flexure. FIG. 18 illustrates the top profile of the fixed link 490. The tail 500 of the fixed link is opposite the front end 492, and the tail is such that it functions as a limit for the range of motion of the fixed link when connected to another link. Indents 494 of the link 490 are adapted to receive the vertical side channels, not shown. When side channels, for instance 520 and 535, are fastened to the fixed link, as shown in FIG. 19, a centerline can be drawn from the midpoint of the width of a side channel on one side through the midpoint of the width of the side channel on the opposite side. Link 525 has holes 531 and 533 with rotating pins in them, and similarly, link 510 has pin holes 516 and 518 that respectively allow the links to move rotationally. The tails (e.g. tails 514 and 529) of the attached fixed links 510 and 525 fall in line with the centerline. This shows that the side channels 520 and 535 of the fixed links 510 and 525 coupled with their tails 514 and 529 act as stops for the range of rotational motion of the fixed link, and the rotational range is limited. This range limiting ensures that the product flowing through the flexible chain diverter system will not be hindered in any way by bends in the chain of too tight a radius to pass products.

The guide block (2) serves the purpose of acting as a surface for the product to coast along aiding in guiding the product along the path of travel through the diverter. The guide block optionally contains three distinct features, the mounting body (the main portion that is fastened by a screw to the side channel), and two appendages on either side, alternated vertically from each other about a centerline vertical from the center of the mounting hole. These appendages act as a link with the other guide blocks of connected links providing a near-smooth rail for the product to flow through the conduit.

The side channels (1) of the links act as the vertical framework that supports the spring links, and hold the guide blocks in place so that the product can be consistently pushed through the conduit. As previously mentioned, these channels not only provide rigidity, but also act as limiting stops for the rotational motion of each link. The side channel is composed of a strip of sheet metal or else some other rigid material, with bent edge flanges to provide strength. It is through this strip that holes are punched in order to locate the guide blocks, support blocks, and spring links in place.

Although the flexible chain diverter system has been described using detailed components, it is to be understood that this flexible chain diverter system is not limited only to use of the previously mentioned components. The side channels can be of varying profiles to accommodate the range of products to be passed through the diverter. The guide blocks may contain small rollers to aid in near-frictionless movement of product through the diverter. Angled air holes may be added to these guide blocks spraying air along the travel path to speed up the flow of product. It may be necessary that each inner and outer link contain four spring links, two at one end of the side channel, and two at the other end of the side channel, with product flowing below the top spring links, and over the bottom spring links. This would enable more rigidity and a greater force necessary to stretch the overall chain length.

The diverter system coordinate system is defined with the positive Z direction falling parallel to a line drawn from the support block (3) along the side channel upward toward the spring links. The positive Y must be defined as perpendicular to the direction of flow through the chain at all times. Positive Y and negative Y can be interchanged; it is not crucial how to define these positions. The X axis is defined as always parallel to the direction of flow at all times. Let it be noted that this flexible chain diverter system is not limited to use in the orientation shown. This chain may also be oriented about the x axis so that the positive z axis is parallel with the ground plane. This would allow for product to travel upward or downward to entry gates in different elevation planes.

Alternatively, the flexible chain guide does not have to be limited to product flow, but can be applied to wire routing conduit or conduit for air lines where the length may be variable. The guide blocks can be replaced with a long flexible and stretchable piece of wear-resistant material, fastened to each side channel of each link. This would enable the chain to hold alignment easily but would provide a hindrance to replacing individual links. The guide blocks could also be a part of or incorporated into the channels. The support blocks on which the system sits, could be replaced with rollers. The flexible diverter chain could be suspended with the support blocks designed with a flange which angles under the conduit to provide a footing for the product to rest on as it flows through the conduit.

In another example, the width of the conduit between the guide blocks could be decreased so as to pinch the narrowest points of the product bottles enabling them to slide through the conduit without need of support underneath by the guide blocks or by a surface. The flexible and spring-like nature of the flexible chain diverter system has properties such that with a long enough chain, a spiral path can be achieved by wrapping the chain around until it is tangent with its entry opening, and then moving the end opening downward directly below the entry opening. This would accomplish the purpose of allowing the flow of bottled product on one plane of conveyor to move downward to a lower conveyor in a minimal space constraint.

Figure 12A:
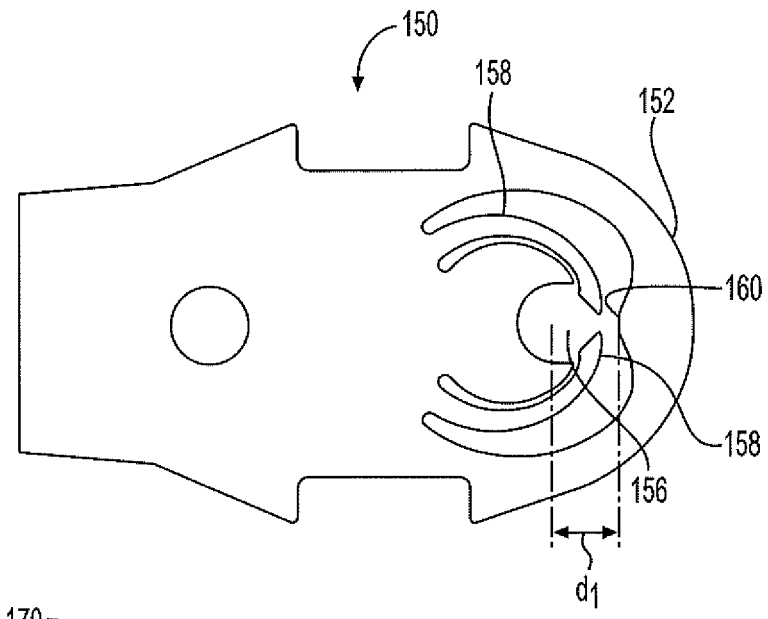
FIGS. 12A-C are top views of spring links with pin containment valley and mandible tab variations.
Figure 12B:
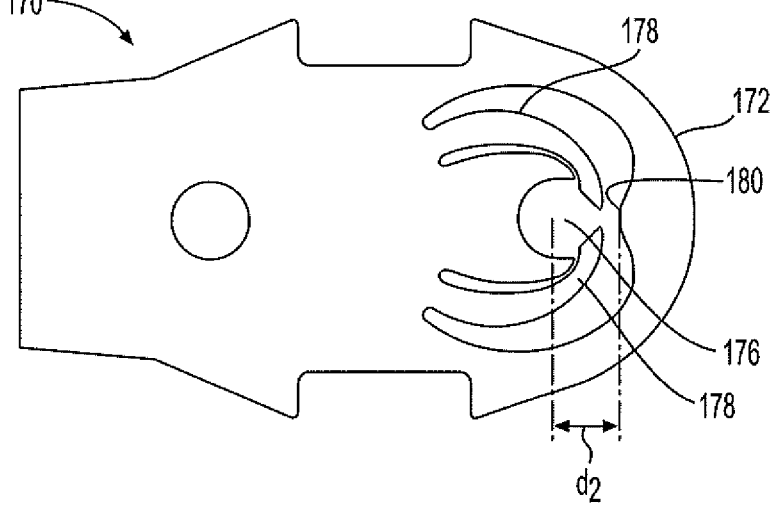
Figure 12C:
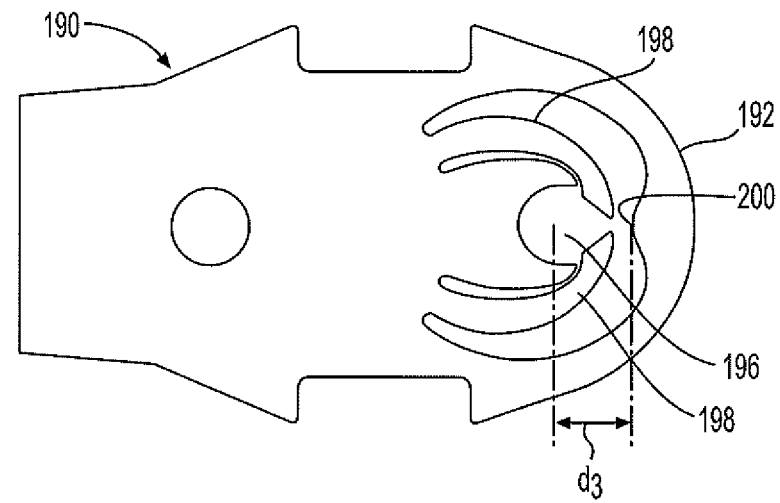

The spring link described herein can also be modified or of different design to fit specific requirements of the applications in which it is used. For instance, FIGS. 12A-C illustrate examples of the change in design of the pin containment "valleys" and "mandible tabs" and how these changes affect the overall spring function and maximum stretched length of the chain. It can be seen in FIG. 12A-C, the spring function of the spring link, specifically the front portions 152, 172 and 192 can be changed to make the chain harder to stretch or easier by adjusting the design of the mandibles. Link 150 in FIG. 12A is shown with the smallest cross-section design of mandible tabs 158 of the three examples. These small cross section tabs 158 contain less strengthening material and thus are easier to bend when the chain is stretched. The stop 160 feature still provides a hard stop that keeps the pin from fully leaving the containment of the valley 156, and this stop feature limits the amount of stretch d1 of the chain. Link 170 in FIG. 12B is shown with an increased mandible tab 178 cross section. It is much thicker near the base of the mandible tabs 178 (as a result the material around the pin containment valley 176 has been decreased to allow for the increase in material of the mandible tabs) and the result is a stiffer feeling of spring when the chain is stretched. The stop 180 still limits the amount of stretch d2 of the chain to the same amount as link A. This is due to the distance from the face of the stop feature to the center of the pin containment valley remaining unchanged. Link 190 in FIG. 12C is shown with a slightly larger mandible tab 198 length than link B, but with a similar thickness near the base of the tabs as link 170 in FIG. 12B, This results in a stiffness of spring feeling very similar to link 170. The main change in this link 190 is the distance d3 between the center of the valley 196 and the face of the stop 200 feature. This distance has been increased allowing for the chain to be stretched to a max length longer than the chain made of link 150 or the chain made with link 170 design. The mandible tab 198 length was increased in order to ensure the pin does not leave containment as the chain is stretched to its full length.

It is of note that the currently operating flexible diverter chain is composed of the links of design A containing 16 links (8 outer and 8 inner links). This chain is capable of stretching an additional 2.56 inches more than its relaxed length of 38.25 inches. But this stretch length can be increased by applying the previously explained design changes. Still further alternatively, the mandible tabs are not necessary. The U-shape valley may simply be positioned behind an opposite stop. This may allow the link to move more freely than if the mandibles were biasing the pin back toward the valley. But, the flexibility of the spring link material may provide some flex and spring as the chain is stretched or retracted.

Figure 13A:
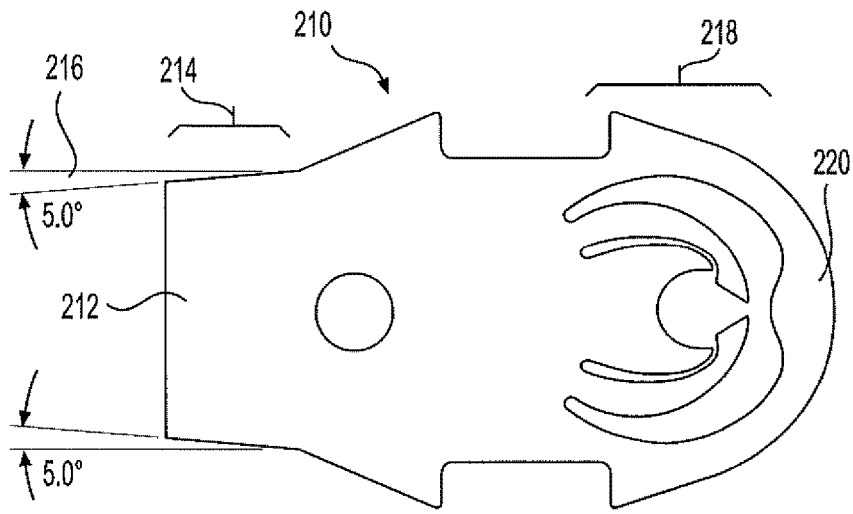
FIGS. 13A-C are top views of spring links with relatively different tail angles.
Figure 13B:
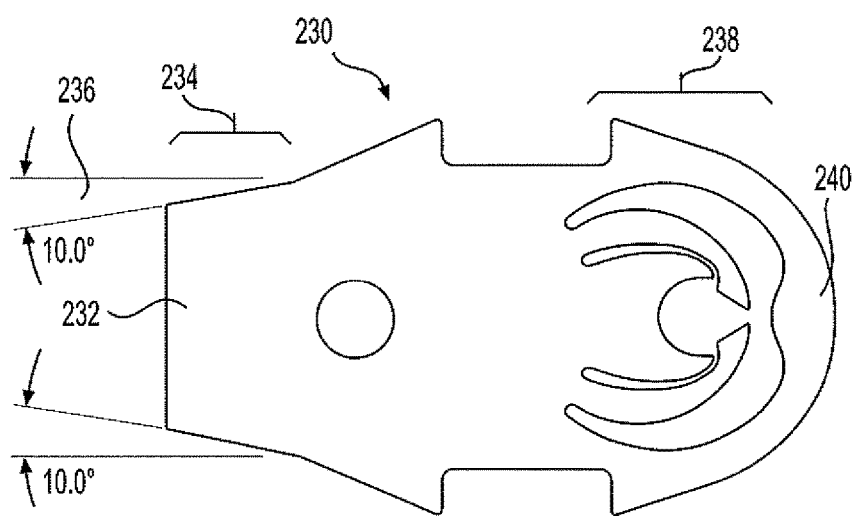
Figure 13C:
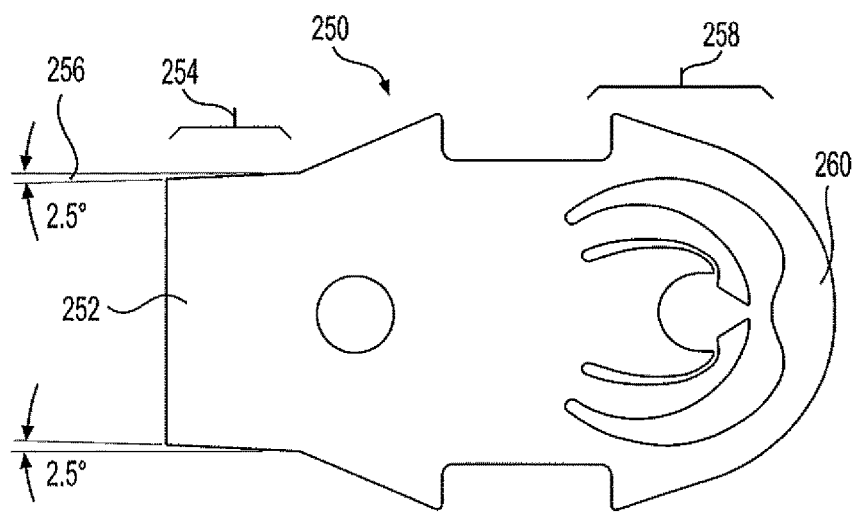

In addition to the impact of a design change of the mandible tabs and stop feature of the spring links, the width of the tail of the spring links can also be modified to affect the rotational travel of each chain link and thus affecting the bend radius of the chain. As was previously described (and shown in FIGS. 10 and 11), the function of the tail of the spring link restricts the amount of rotational movement of the chain links. FIGS. 13A-C demonstrate possible changes in the tail angle and how this impacts the rotational movement of each link in the flexible chain diverter system. The first angle, shown in FIG. 13A, is a recommended angle (5 degrees) to ensure smooth pass through of product in the chain. The second angle, as shown in FIG. 13B, is double the first angle (10 degrees) and allows the chain to be bent sidewise in a tighter radius. The third angle, as shown if FIG. 13C, is half of the first angle (2.5 degrees) and the chain can be seen to have a much larger bend radius when the links are bent to the side. FIGS. 14A-C and FIGS. 15A-C illustrate the impact of the tail angle changes. It is of note that one currently operational flexible chain diverter system contains spring links with tails of design D (5.0 degree tail angle in FIGS. 13A, 14A and 15A). This chain is capable of a maximum bend angle of 122 degrees (bend angle can be seen on FIG. 14A as the 24.4 degrees from the horizontal of the design D chain composed of 4 links). It is seen from FIGS. 14A-C that this angle of bend can completely be changed by altering the tail angle.

FIGS. 13A-C are silhouette examples of flexible links 210, 230 and 250 assigned shape indicators D, E and F respectively. The differences between the shapes is solely the tail angles 216, 236 and 256 respectively. Each link 210, 230 and 230 has a front portion 218, 238 and 258 and front edge 220, 240, and 260. The back portions 212, 232, and 252 of the links 210, 230 and 250 all define tail portions 214, 234, and 254. The tail portions 214, 234, and 254 define outside walls that have converging lines. These converging lines are defined by their angle to an arbitrary line that goes straight backwards from where the tail starts to converge. The tail angle 216 is 5 degrees, the tail angle 236 is 10 degrees, and the tail angle 256 is 2.5 degrees. These tail angles shown are examples of tail angles. The tail angles may be varied depending on the bend angles that an entire flexible chain diverter system may require in use. The angles may also vary depending on the width of the flexible links versus the distance between the opposite vertical sidewall channels that are used to contain the tails when they rotate.

Figure 14A:
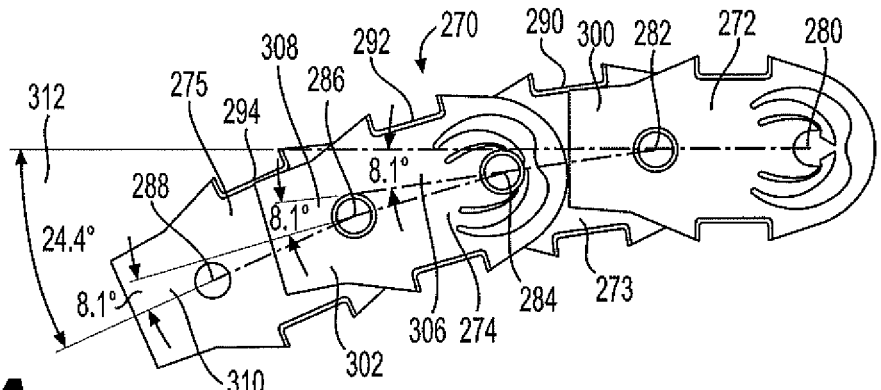
FIGS. 14A-C are top views of portions of diverter chains shown in FIGS. 13A-C respectively illustrating the tail angle changes and effect on link rotational travel.
Figure 14B:
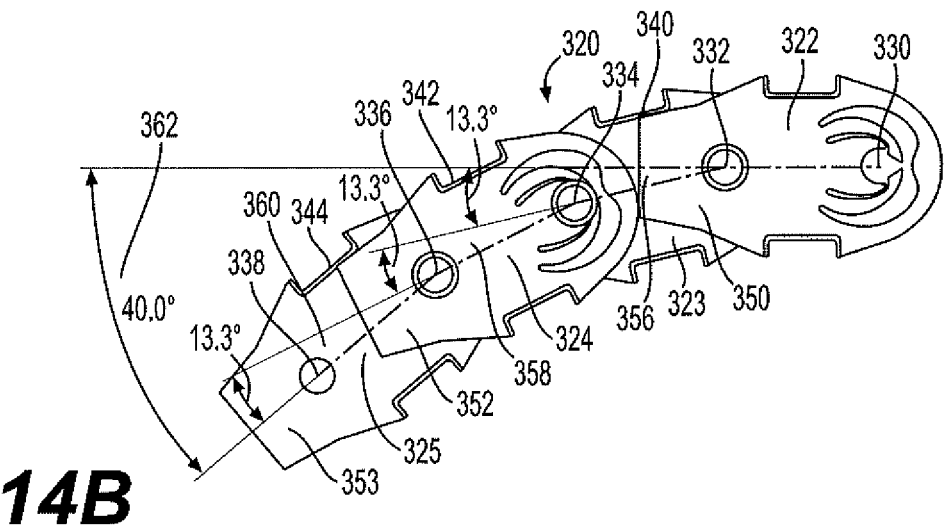
Figure 14C:
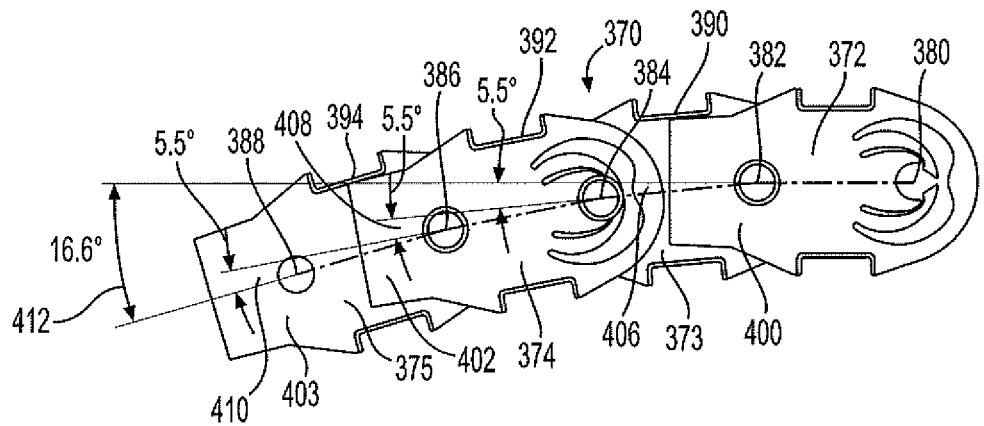
Figure 15A:
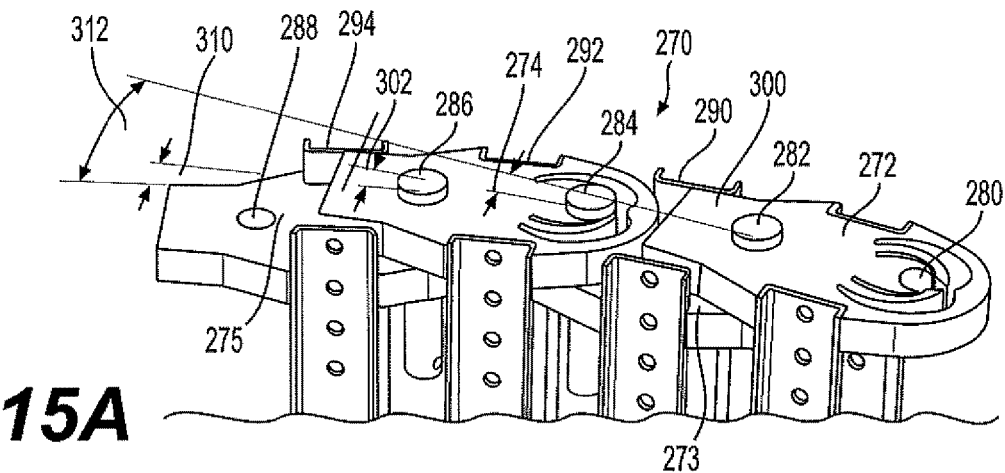
FIGS. 15A-C is a perspective view of the top of links having different tail angles as shown in FIGS. 13A-C and FIGS. 14A-C respectively and illustrating the tail angle changes and effect on link rotational travel.
Figure 15B:
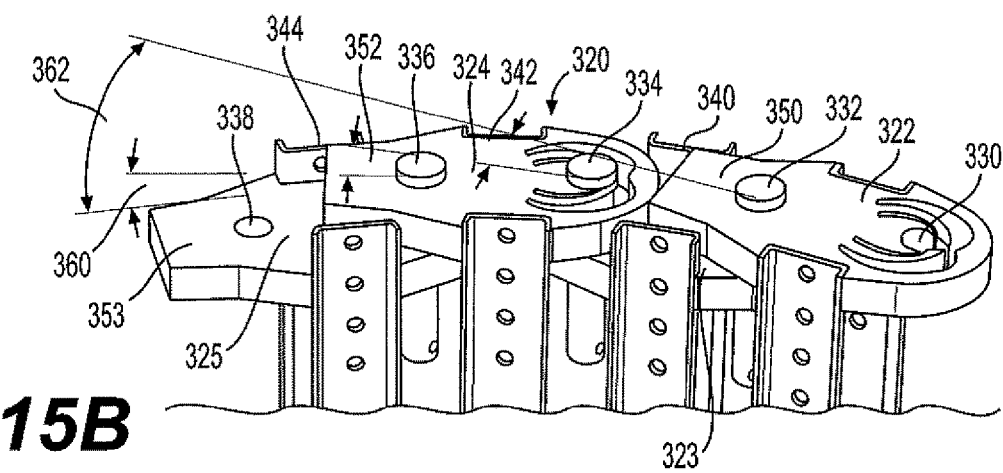
Figure 15C:
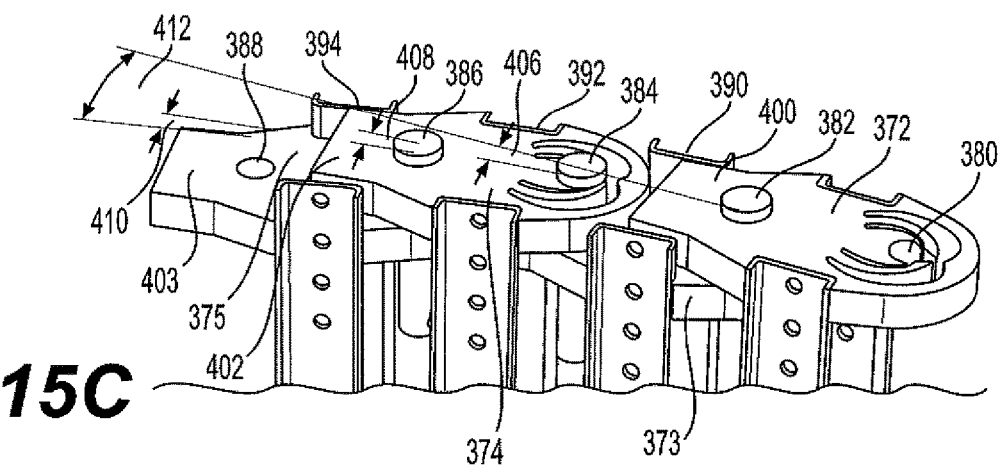

FIGS. 14A and 15A illustrate a pair of links having the tail shape D as shown in FIG. 13D where the tail angle is 5 degrees. FIGS. 14B and 15B illustrate a pair of links having the tail shape E of FIG. 13B where the tail angle is 10 degrees. And FIGS. 14C and 15C illustrate a pair of links having the tail shape F of FIG. 13C where the tail angle is 2.5 degrees. In each of these examples, there is a stacked pair of links. Also, the geometry of the links, and specifically the width of the tails and the distance between the sidewall channels, are generally proportional for comparison with the only variance being the different tail angles.

Turning to FIGS. 14A and 15A, there is shown a pair of links 270. The pair of links 270 is formed of spring links 272, 273, 274 and 275. Spring links 272 and 274 are positioned above and staggered sequentially with spring links 273 and 275. Only three pins 282, 284 and 286 are shown. Therefore, the links 272, 273, 274 and 275 are shown with rotation around those three pins 282, 284 and 286. This way, only three angles of rotation 306, 308 and 310 are shown that cumulatively reveal a rotation angle 312 of 24.4 degrees. As can be seen with this top view, tails 300 and 302 are restrained in their rotation by the sidewall channels 290 and 294. Although not seen in this view, a tail portion of spring link 273 is restrained by sidewall channel 292 underneath spring link 274.

Turning to FIGS. 14B and 15B, there is shown a pair of links 320. The pair of links 320 is formed of spring links 322, 323, 324 and 325. Spring links 322 and 324 are positioned above and staggered sequentially with spring links 323 and 325. Only three pins 332, 334 and 336 are shown. Therefore, the links 322, 323, 324, and 325 are shown with rotation around those three pins 332, 334 and 336. This way, only three angles of rotation 356, 358 and 360 are shown that cumulatively reveal a rotation angle 362 of 40 degrees. As can be seen with this top view, tails 350 and 352 are restrained in their rotation by the sidewall channels 340 and 344. Although not seen in this view, a tail portion of spring link 323 is restrained by sidewall channel 342 underneath spring link 324.

Turning to FIGS. 14C and 15C, there is shown a pair of links 370. The pair of links 370 is formed of spring links 372, 373, 374 and 375. Spring links 372 and 374 are positioned above and staggered sequentially with spring links 373 and 375. Only three pins 382, 384 and 386 are shown. Therefore, the links 372, 373, 374 and 375 are shown with rotation around those three links 382, 384 and 386. This way, only three angles of rotation 406, 408 and 410 are shown that cumulatively reveal a rotation angle 412 of 16.6 degrees. As can be seen with this top view, tails 300 and 302 are restrained in their rotation by the sidewall channels 390 and 394. Although not seen in this view, a tail portion of spring link 373 is restrained by sidewall channel 392 underneath spring link 374.

Figure 16B:
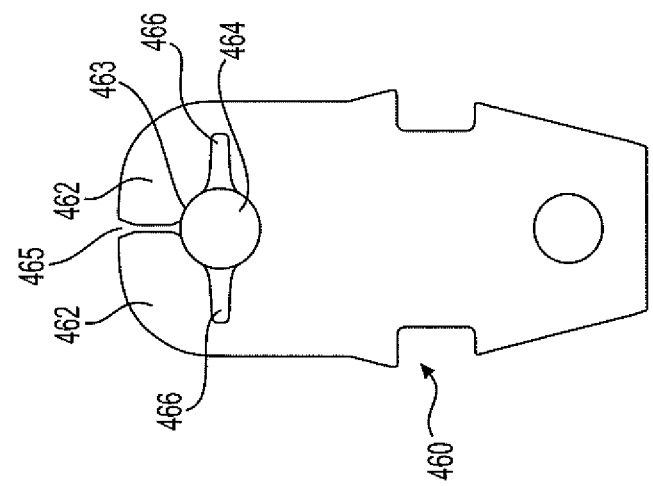
FIGS. 16A and B are top views of flexible links having alternative mandible shapes.
Figure 16A:
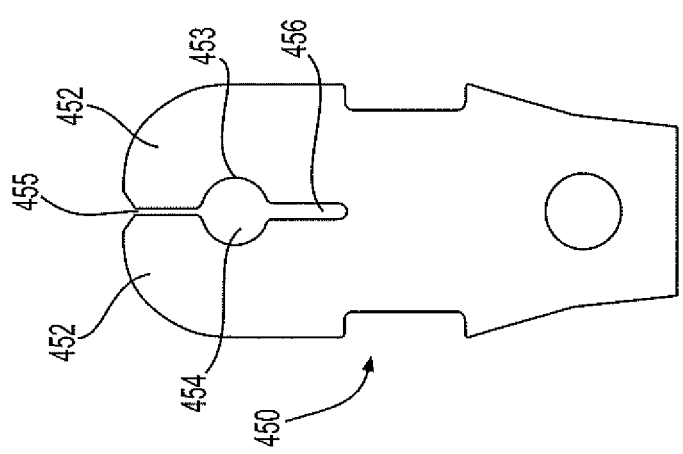

FIGS. 16 A and B illustrate alternative mandible tab constructions. In FIG. 16A, a link 450 is formed of the same flexible and pliable polymer material described earlier herein. The upper portions of the link 450 are a pair of mandible tabs 452 that are shown defining a round pin hole 453 in which is shown a round pin 454. The mandible tabs 452 are separated by a cut 455 above the pin 454 and a slit 456 below the pin. These cut 435 and slit 433 allow the mandible tabs 452 to flex out and in around the pin 454 as it moves upwardly or downwardly with respect to the link 450. Similarly, in FIG. 16B, there is shown a link 460 formed of the same link material described earlier herein. The upper portions of the link 460 are mandible tabs 462. The mandible tabs 462 wrap around a pin 454 in a circular opening 463 defined between the mandible tabs 462. There is a cut 465 between the tabs 462 and slits 466 beside the hole 463. The cut 465 and slits 466 allow the mandible tabs 462 to flex as the pin 464 may move upwardly and downwardly with respect to the top view of FIG. 16B of the link 460.

Figure 17:
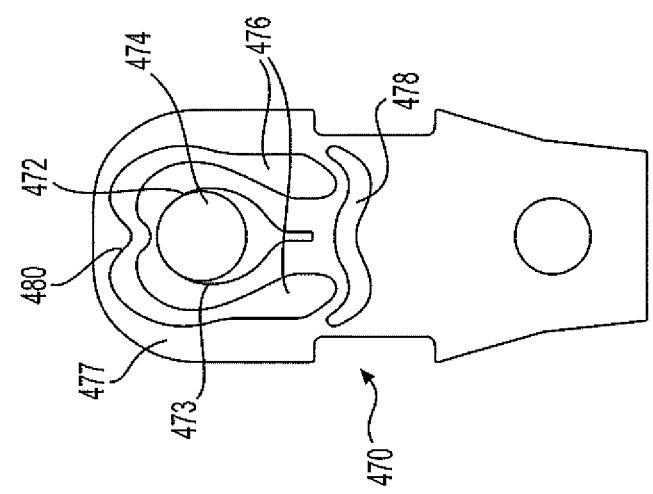
FIG. 17 is a top view of a link having an alternative example of a valley structure as described herein.

FIG. 17 is a top view of another link 470. The link 470 defines a collar 472 around and defining a circular space 473 in which is shown a pin 474. The collar 472 is surrounded by a cavity 476. There is an additional cavity 478 under the collar 474. The cavities 476 and 478 allow the pin 474 in the collar 472 to move up and down. The outer portion 477 of the link 470 further comprises a bump 480 which contains the pin 474 and collar 472 and limits the upward movement of the pin.

Other embodiments of the present invention will be apparent to those skilled in the art from consideration of the specification. It is intended that the specification and figures be considered as exemplary only, with a true scope and spirit of the invention being indicated by the claims.

That which is claimed is:

1. A flexible chain diverter for use in a conveyor system, the flexible chain diverter comprising:
    a plurality of chain links, each chain link comprising a plurality of vertical sidewall channels having upper and lower portions and a bottom of the lower portion adapted to rest on a conveyor surface under the chain links,
    at least one of the plurality of chain links comprising a flexible spring link fixed on their sides to the upper portion of a pair of the vertical sidewall channels,
    each at least one spring link having two pin holes with one pin hole through a back portion and one pin hole through a front portion of the spring link,
    wherein the back portion pin hole is generally round and corresponds generally in size to a first round link pin adapted to be mounted therethrough,
    wherein the front portion of the spring link is annular and has an extension into the annular space, and further wherein the extension defines a valley that is a recess that is open in the direction of the front side of the spring link, and the front portion further defines mandibular tabs and a stop bump,
    the valley extends from a rear side of the front portion of the spring link and the mandibular tabs are a pair of tabs that extend almost but not entirely across the open section of the valley and form a gap between them, and the stop bump extends backwardly from the back side of the front portion of the spring link, the stop bump being aligned with the open section of the valley and a gap between the mandibular tabs,
    wherein a second round link pin is adapted to be mounted through the valley and is longitudinally movable for a predetermined distance across the valley to engage the mandibular tabs and to be stopped by the stop bump.

2. A flexible chain diverter as described in claim 1, further comprising guide blocks fixed to the inside of the vertical sidewall channels.

3. A flexible chain diverter as described in claim 1, further comprising a support block attached to each bottom of the vertical sidewall channels, wherein the support blocks are adapted to rest on the conveyor surface.

4. A flexible chain diverter as described in claim 1, wherein the spring link comprises a tail section of the back portion, and the tail is adapted to be retained within the upper portions of the vertical sidewall channels of an adjacent chain link.

5. A flexible chain diverter as described in claim 4,
wherein the tail defines a tail angle that is converging so that the tail is narrowing at the end of the back portion of the spring link.

6. A flexible chain diverter as described in claim 5, wherein the tail angle is between about one and 15 degrees.

7. A flexible chain diverter as described in claim 5,
wherein the tail angle is between about 2 and 10 degrees.

8. A flexible chain diverter as described in claim 1, wherein the spring link is formed of a flexible polymer foam.

9. A flexible chain diverter as described in claim 1,
wherein the spring link is formed of rubber.

10. A flexible chain diverter as described in claim 1, wherein the valley defines a semi-circular U-shape.

11. A flexible chain diverter as described in claim 1,
wherein the plurality of chain links comprises a non-spring link.

12. A flexible chain diverter for use in a conveyor system, the flexible chain diverter comprising:
   a plurality of chain links, each chain link comprising a plurality of vertical sidewall channels having upper and lower portions and a bottom of the lower portion adapted to rest on a conveyor surface under the chain links,
   each chain link further comprising a flexible spring link fixed on their sides to the upper portion of a pair of the vertical sidewall channels,
   each spring link having two pin holes with one pin hole through a back portion and one pin hole through a front portion of the spring link,
   wherein the back portion pin hole is generally round and corresponds generally in size to a first round link pin adapted to be mounted therethrough,
   wherein the front portion of the spring link is annular and has an extension into the annular space, and further wherein the extension defines a valley that is a recess that is open in the direction of the front side of the spring link, and the front portion further defines mandibular tabs and a stop bump,
   the valley extends from a rear side of the front portion of the spring link and the mandibular tabs are a pair of tabs that extend almost but not entirely across the open section of the valley and form a gap between them, and the stop bump extends backwardly from the back side of the front portion of the spring link, the stop bump being aligned with the open section of the valley and a gap between the mandibular tabs,
   wherein a second round link pin is adapted to be mounted through the valley and is longitudinally movable for a predetermined distance across the valley to engage the mandibular tabs and to be stopped by the stop bump.

13. A flexible chain diverter as described in claim 12,
wherein each spring link comprises a tail section of the back portion, and the tail is adapted to be retained within the upper portions of the vertical sidewall channels of an adjacent chain link.

14. A flexible chain diverter for use in a conveyor system, the flexible chain diverter comprising:
   a plurality of chain links, each chain link comprising a plurality of vertical sidewall channels having upper and lower portions and a bottom of the lower portion adapted to rest on a moving conveyor surface under the chain links,
   at least one of the plurality of chain links further comprising a flexible spring link fixed on their sides to the upper portion of a pair of the vertical sidewall channels,
   each at least one spring link having two pin holes with one pin hole through a back portion and one pin hole through a front portion of the spring link
   wherein the back portion pin hole is generally round and corresponds generally in size to a first round link pin adapted to be mounted therethrough,
   wherein the front portion of the spring link is annular and has an extension into the annular space, and further wherein the extension defines a valley that is a recess that is open in the direction of the front side of the spring link, and the front portion further defines a stop bump,
   the valley extends from a rear side of the front portion of the spring link and defines a semi-circular U-shape, and the U arms of the U-shape extend almost but not entirely across the open section of the U-shape valley and form a gap between them, and the stop bump extends backwardly from the back side of the front portion of the spring link, the stop bump being aligned with the open section of the U-shape valley,
   wherein a second round link pin is adapted to be mounted through the U-shape valley and is longitudinally movable for a predetermined distance across the valley to engage the U arms and to be stopped by the stop bump.

* * * * *